W. CAMPBELL, dec'd.

J. & J. A. CAMPBELL, Admr's.

Corn-Planter.

No. 6,372. Reissued April 13, 1875.

Attest.

John O'Gara

Herman Merrell

James Campbell by Moody & Boyd his Attorneys

THE GRAPHIC CO. PHOTO-LITH. 39 & 41 PARK PLACE, N.Y.

UNITED STATES PATENT OFFICE.

JAMES CAMPBELL, FOR HIMSELF, AND JAMES A. CAMPBELL, OF HARRISON, OHIO, ADMINISTRATOR OF WILLIAM CAMPBELL, DECEASED, (ASSIGNEE OF ONE-HALF INTEREST.)

IMPROVEMENT IN CORN-PLANTERS.

Specification forming part of Letters Patent No. 133,199, dated November 19, 1872; reissue No. 6,372, dated April 13, 1875; application filed July 16, 1874.

*To all whom it may concern:*

Be it known that I, JAMES CAMPBELL, of Harrison, in the county of Hamilton and State of Ohio, have invented an Improvement in Corn-Planters, of which the following is a specification:

The present improvements, although available for other corn-planters, are especially designed for, and applicable to, planters such as described in the patent granted to myself and William Campbell on the 8th of May, 1866, and on the 9th of November, 1869.

My invention consists of a shield-brace, having at its lower end a hook, which is rigidly secured to the furrow-tooth, while the upper end of said shield-brace is connected with the frame of the planter between the tread of the driving-wheel and the seed-tooth. My invention further consists of certain other improvements, which will be fully hereinafter described, and pointed out in the claims.

Figure 1:
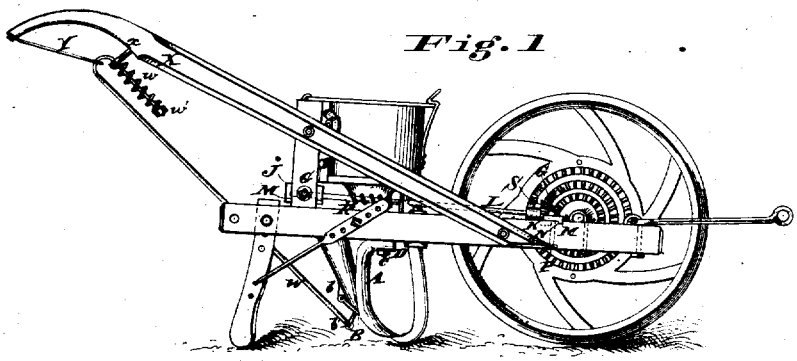
Figure 2:
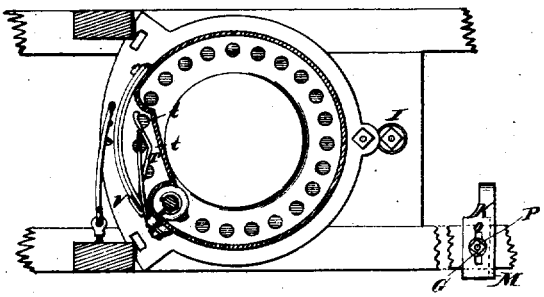
Figure 4:
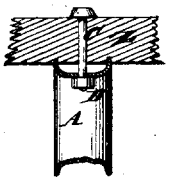
Figure 3:
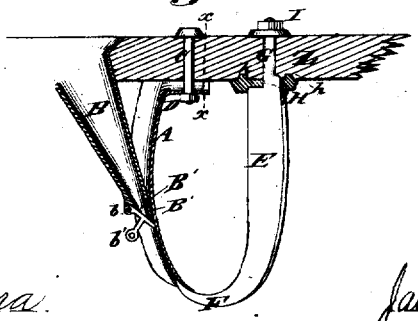

In the accompanying drawings, Figure 1 is a side elevation of a corn-planter illustrating my invention. Fig. 2 is a horizontal section through the hopper-box. Fig. 3 is a vertical longitudinal section through the center of the seed-tube, drill-teeth, and shield-brace. Fig. 4 is a vertical transverse section at *x x*, Fig. 3.

A represents the furrowing-tooth, the head A′ of which projects horizontally forward, and is pierced to receive a screw-bolt, C, which, in conjunction with a nut, D, serves to hold the said tooth to the central block Z of the frame. The tooth is formed, from end to end, with a transverse curvature. This imparts to the lip A a concavity at top, causing it to bear against the under side of the beam by its two edges, as shown, and to possess some resilience, so that should the material of the frame shrink, the elasticity of the lip will prevent it from becoming loose. The transverse curvature also produces, within the body of the tooth, an effective brace, thus imparting great strength at the bend or shoulder, from which the tooth projects downward from the frame. E is a combined brace and shield, in the form of a "jumping colter," having its lower end F hooked backward, and rigidly connected to the point of the furrowing-tooth, and its upper end provided with a shank, G, passing through a collar or shoe, H, and secured to the frame by a nut, I. The screwing home of the said nut I puts a strain on the under side of the tooth, and acts as a very effectual stiffener and brace. The shield E also serves to protect said tooth from the injurious impact of rocks and other impediments, and to prevent stalks and trash from catching on the tooth. The collar or shoe H is formed with the spurs *h*, which, being pressed into the wood, hold the said collar stationary, and more effectually prevent any yielding of the shield. The journal-brackets J and K of the worm and pinion-rod L have cast lips or fins M projecting from their under sides, which lips enter grooves N in the top of the frame. The said brackets have also slots O, which are traversed by bolts P, having nuts G, which unite said brackets to the frame. The slots enable the proper adjustment of the worm R and pinion S, so as to properly mesh with their co-operative parts, and the lips M and nuts Q co-act to hold said brackets firmly to their proper position. I thus dispense with the necessity of gearing the entire bracket-shank into the frame, and by this simple expedient I overcome a great practical difficulty which has been experienced from the liability of gaining irregularly or to an improper depth, and thus occasioning the shaft to bind in its bearings. These provisions become especially valuable from the fact that whenever it is necessary to change the pinion S to another circular rack the bracket is required to be pushed back enough to disengage the said pinion and rack, and to engage it with another one, when it is again pushed forward, and were there no way of holding the bracket to its proper parallelism the labor of readjustment and chance of disarranging the parts would be greatly increased.

Machines constructed as described in my aforesaid patents were objectionable in that grain which, escaping the proper cut-off brush, got out onto the extension of the revolving table in rear of the grain-box, would either be lost, or would wedge under the rear edge of the box.

To prevent this I have added to said machine a deflecting wire, T, so formed as to reconduct into the box, through aperture U, whatever grains may pass the cut-off; and in order that no grains may bind under the said deflector it has a hinged attachment, V, to the frame. Said deflector is also useful in preventing the overfilling of the cup or seed-duct by superfluous grains. The hinge V is formed by a simple bend in the wire T, so as to permit both vertical and lateral deflection, and is located at the outer edge of the box-plate. From thence the wire extends obliquely across the line of the seed-cells, and is then rebent to form a guard, *t*, at the opening of the discharge-tube, behind which the grains are directed into the empty cells, or into the line of the cells, by the end $t^2$ of the wire co-operating with the outwardly-trending wall of the grain-box. It will be observed that the deflector operates as described, owing to the retention of the surplus grains within the circle of the cells.

The aperture U may be dispensed with, the grains being carried back into the box by entering the seed-cups after they have passed beyond the dropping tube B.

For dropping in hills, when desired, I employ a valve, B′, hinged at *b* to the seed-tube B, and provided with a projecting arm, *b′*, to which is attached a rod, W, the upper end of which, being bent so as to project downward, passes through an eye, *x*, on the handle X, and receives below the said eye a spring, *w*, confined by a nut, *w′*. The spring thus exerts a pressure endwise of the rod W in a direction to close the valve B′, and the adjustment of the nut regulates the extent of pressure as required.

This spring and adjusting-nut are described in the previous patent of 1866, hereinbefore referred to; but the present mode of connecting the pull-rod directly to the dropping-valve, instead of through the medium of a rock-shaft, is superior in some respects.

As a convenient mode of operating the pull-rod, I employ a strap, Y, attached at one end to the end of the handle X, and at the other to the loop or bend of the rod. A simple pressure of the fingers upon the strap Y opens the valve with great ease.

Parts not herein specifically described may be made as set forth in my previous patents, or in other suitable ways.

I claim as my invention—

1. In a corn-drill, mounted upon and guided by a front driving pilot-wheel, the shield-brace E, with its hook F rigidly secured to the furrow-tooth, and the frame of the planter between the tread of the driving-wheel and the seed-tooth, as and for the purpose described.

2. The furrowing-tooth A, with forwardly-projecting head or lip A′, and constructed with a continuous transverse curvature, as herein described, to render the head elastic, and to improve its hold, and to strengthen the angle of the tooth, as set forth.

3. The shield and brace E, constructed with the hook F and screw-shank G, and the collar or shoe H and nut I, in combination with the furrowing-tooth A, as herein shown and described, for stiffening and bracing the same, as set forth.

4. The direct pull-rod W, spring *w*, adjusting-nut *w′*, and hand-strap Y, combined and arranged, as set forth, for operating the hiller-valve B′.

5. In combination with the seed-box, the floating wire T, for reconducting grain into the box, substantially as herein set forth.

In testimony whereof I have hereunto set my hand this 8th day of July, 1874.

Witnesses: JAMES CAMPBELL.

EDWARD BOYD,

JOHN O. GARA.